(12) United States Patent
Leyh et al.

(10) Patent No.: US 9,653,909 B1
(45) Date of Patent: May 16, 2017

(54) FAULT HANDLING FOR MOTOR CONTROLLERS

(71) Applicant: X Development LLC, Mountain View, CA (US)

(72) Inventors: Greg Leyh, Brisbane, CA (US); George Edward Homsy, San Rafael, CA (US); Leo Casey, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/985,603

(22) Filed: Dec. 31, 2015

(51) Int. Cl.
*H02H 7/08* (2006.01)
*H02H 3/20* (2006.01)
*H02H 7/06* (2006.01)

(52) U.S. Cl.
CPC ............... *H02H 3/20* (2013.01); *H02H 7/06* (2013.01); *H02H 7/0833* (2013.01)

(58) Field of Classification Search
CPC .. H02H 1/00; H02H 3/00; H02H 3/027; H02H 3/20; H02H 5/04; H02H 3/24; H02H 3/13; H02H 5/00; H02H 7/00; H02H 9/00; H02H 9/02; H02H 7/08
USPC ...... 361/1, 2, 15, 16, 17, 18, 19, 20, 21, 22, 361/23, 30, 43, 90, 91.1; 318/400.01, 318/700, 727, 140, 400.21, 400.22, 800, 318/801; 363/40, 44, 95, 120, 174, 175
See application file for complete search history.

(56) References Cited

U.S. PATENT DOCUMENTS

| | | | |
|---|---|---|---|
| 7,433,165 B2 | 10/2008 | Carter et al. | |
| 7,504,743 B2 * | 3/2009 | Matsumoto | G01R 31/006 307/10.1 |
| 8,755,165 B2 | 6/2014 | Hansen et al. | |
| 2011/0175699 A1 | 7/2011 | Huss et al. | |

FOREIGN PATENT DOCUMENTS

| | | |
|---|---|---|
| WO | 2014031312 A1 | 2/2014 |
| WO | 2014143366 A1 | 9/2014 |

* cited by examiner

*Primary Examiner* — Antony M Paul
(74) *Attorney, Agent, or Firm* — McDonnell Boehnen Hulbert & Berghoff LLP

(57) ABSTRACT

In one aspect, a method is described. The method may include operating a plurality of circuit elements, and operating a plurality of fault-mitigation circuits. Each circuit element may include an energy storage element, each individual fault-mitigation circuit may be electrically coupled in parallel to a respective circuit element, and each individual fault-mitigation circuit may include a switch. The method may include detecting an electrical fault in one of the circuit elements and cycling the switch of the fault-mitigation circuit coupled in parallel to the faulty circuit element between an open position and a closed position until the storage element of the faulty circuit element is discharged of energy, at which point the switch remains closed.

20 Claims, 8 Drawing Sheets

FAULT HANDLING FOR MOTOR CONTROLLERS

BACKGROUND

Unless otherwise indicated herein, the materials described in this section are not prior art to the claims in this application and are not admitted to be prior art by inclusion in this section.

Various components of a vehicle system (as well as other types of systems), such as motors and/or generators, may be arranged in series to form a stacked topology. Stacked topologies are often advantageous because they present certain efficiencies.

SUMMARY

Methods and systems for handling faults within a system, such as an energy kite, are described herein. An energy kite may have rotors coupled to a number of motor-generators. The motor-generators may be connected in series to form a stack. During operation, an electrical fault may occur in one of the motor-generators. Due to the fault, a voltage across the faulty motor-generator may increase or decrease, causing the unfaulty motor-generators to be subjected to an under-voltage or overvoltage condition. To compensate for this, a fault-mitigation circuit may short circuit the faulty motor-generator, facilitating proper operation of the remaining motor-generators. Current may be diverted around the faulty motor-generator and passed through the fault-mitigation circuit in any amount at zero voltage. Further, the overall voltage to the stack may be reduced to compensate for increased voltages to the unfaulty motor-generators caused by short circuiting the faulty motor-generator.

In one aspect, a method is described. The method may include operating a number of circuit elements, where each circuit element includes an energy storage element. The method may further include operating a number of fault-mitigation circuits, each individual fault-mitigation circuit being electrically coupled in parallel to a respective circuit element and each individual fault-mitigation circuit including a switch that in a closed position will cause the energy storage element to drain and in an open position will not cause the energy storage element to drain. Further, operating the fault-mitigation circuits may include detecting an electrical fault in one of the circuit elements and cycling the switch of the fault-mitigation circuit coupled in parallel to the faulty circuit element between the open position and the closed position until the storage element of the faulty circuit element is discharged of energy, at which point the switch remains closed.

In a further aspect, a system is disclosed. The system may include a number of circuit elements, where each circuit element includes an energy storage element. The system may further include a number of fault-mitigation circuits, each individual fault-mitigation circuit being electrically coupled in parallel to a respective circuit element and each individual fault-mitigation circuit including a switch that in a closed position will cause the energy storage element to drain and in an open position will not cause the energy storage element to drain. The system may further include a controller coupled to each fault-mitigation circuit, the controller being configured to carry out operations including detecting an electrical fault in one of the circuit elements and cycling the switch of the fault-mitigation circuit coupled in parallel to the faulty circuit element between the open position and the closed position until the storage element of the faulty circuit element is discharged of energy, at which point the switch remains closed.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods and systems can be arranged and combined in a wide variety of different configurations, all of which are contemplated herein.

I. Overview

Illustrative embodiments relate to example fault-mitigation circuits and corresponding control methods. The control methods may be used to operate the fault-mitigation circuits in such a way so as to divert current around a faulty circuit element. This may be useful when circuit elements are arranged in stacked topologies. However, the methods may be useful for circuit elements arranged in other topologies as well, including being electrically isolated from one another.

In an example arrangement, fault-mitigation circuits may be embodied as crowbar circuits, which may include a switch and a current suppressing element. Each fault-mitigation circuit may be electrically coupled in parallel to a respective circuit element, such as a motor or generator.

In an example control method for the example arrangement, a faulty circuit element may be detected. The term "faulty," as used in this disclosure, describes a circuit element whose voltage is above a threshold high value or below a threshold low value. A faulty circuit element may be caused by, for example, an open circuit, a short circuit, or some other aspect of the circuit element that may affect its voltage level. When a faulty circuit element is detected, the switch of the fault-mitigation circuit coupled in parallel to the faulty circuit element may be cycled between an open and closed position at a varying duty cycle. The duty cycle may be increased until it reaches 100 percent and the switch remains closed. Concurrently, the remaining switches coupled in parallel to unfaulty circuit elements may be prevented from cycling and may be held in an open position.

It should be understood that the above examples are provided for illustrative purposes, and should not be construed as limiting. As such, the method may additionally or alternatively include other features or include fewer features, without departing from the scope of the invention.

II. Example Systems

A. Example Energy Kite

Figure 1:
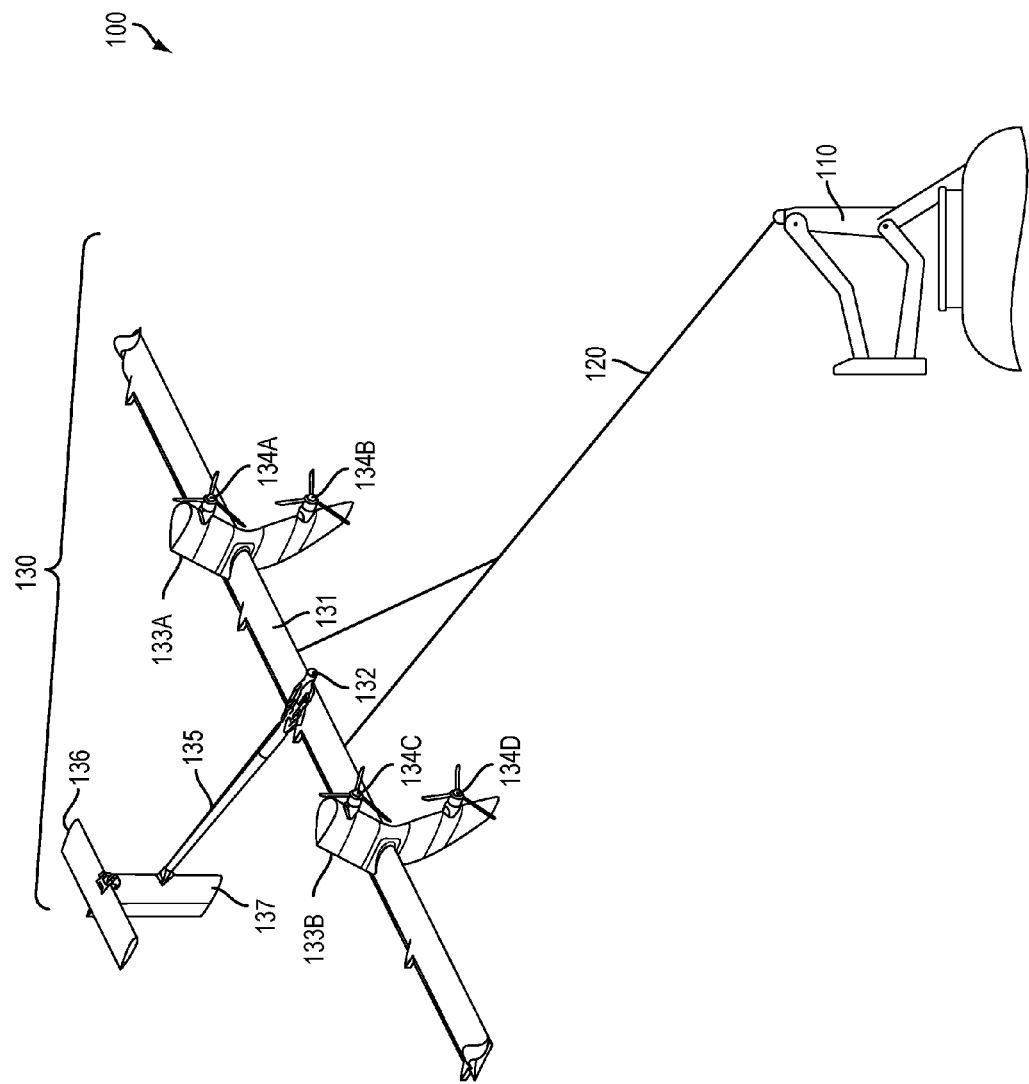
FIG. 1 depicts an energy kite, according to an example embodiment.

An energy kite is a wind energy system, which may also be called an Airborne Wind Turbine (AWT). FIG. 1 depicts an energy kite 100, according to an example embodiment. In particular, the energy kite 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, or crosswind flight.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic, and/or other polymers. The aerial vehicle 130 may be formed of any material that allows for a high thrust-to-weight ratio and generation of electrical energy that may be used in utility applications. Additionally, the materials may be chosen to allow for a lightning hardened, redundant, and/or fault tolerant design which may be capable of handling large and/or sudden shifts in wind speed and wind direction. Other materials may be possible as well.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form that allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety of dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate, via interactions with the wind, which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Example Components of an Energy Kite

Figure 2:
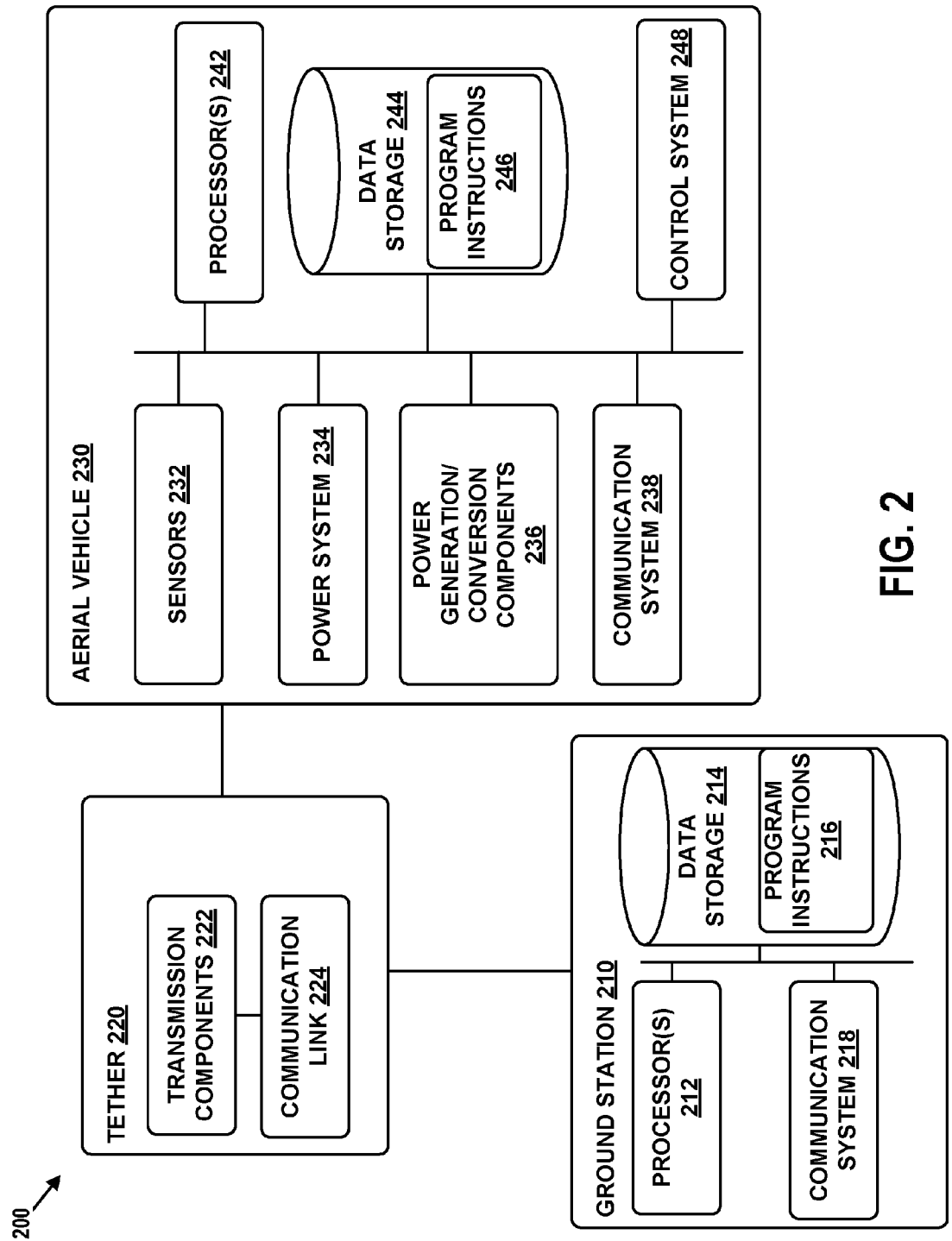
FIG. 2 is a simplified block diagram depicting components of an energy kite, according to an example embodiment.

FIG. 2 is a simplified block diagram illustrating components of an energy kite 200. The energy kite 200 may take the form of or be similar in form to the energy kite 100. In particular, the energy kite 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic, or other memory or disc storage, which may be integrated in whole or in part with at least one of the one or more processors 212. In some embodiments, the data storage 214 may be implemented using a single physical device (e.g., one optical, magnetic, organic, or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include a communication system 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot," or in other words, as a gateway or proxy between a remote support device (e.g., the tether 220, the aerial vehicle 230, and other ground stations) and one or more data networks, such as a cellular network and/or the Internet. Configured as such, the ground station 210 may facilitate data communications that the remote support device would otherwise be unable to perform by itself.

For example, the ground station 210 may provide a Wi-Fi connection to the remote device and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material that allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital, 3-axis magnetometer, which may be used to realize an orientation-independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take on various different forms in various different embodiments. For example, the power system 234 may include one or more batteries for providing power to the aerial vehicle 230. In some implementations, the one or more batteries may be rechargeable, and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot," or in other words, as a gateway or proxy between a remote support device (e.g., the ground station 210, the tether 220, other aerial vehicles) and one or more data networks, such as a cellular network and/or the Internet. Configured as such, the aerial vehicle 230 may facilitate data communications that the remote support device would otherwise be unable to perform by itself.

For example, the aerial vehicle 230 may provide a WiFi connection to the remote device and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of, or be similar in form to, the one or more processors 212, the data storage 244 may take the form of, or be similar in form to, the data storage 214, and the program instructions 246 may take the form of, or be similar in form to, the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

III. Example Fault Handling Circuits

Figure 3:
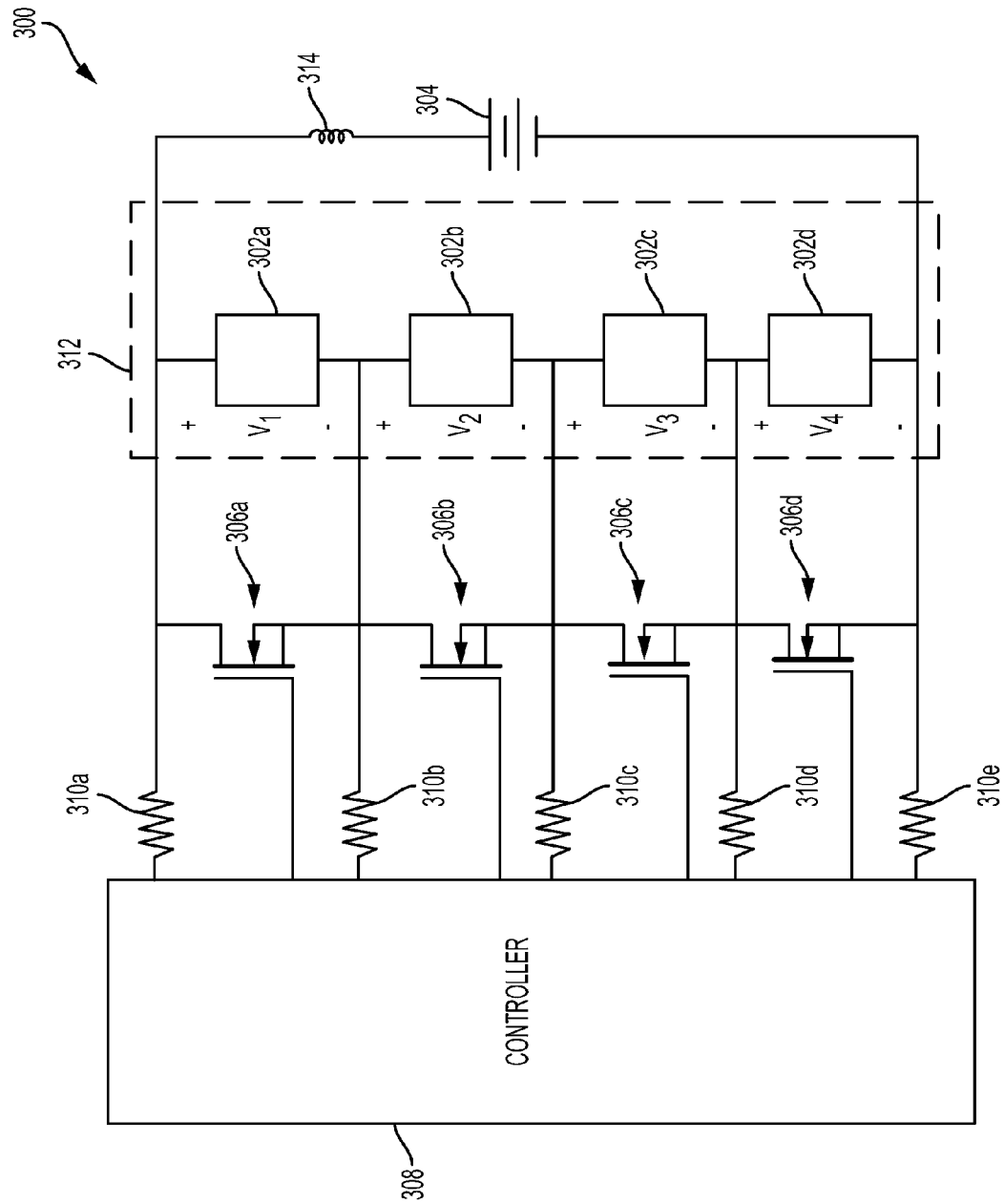
FIG. 3 depicts an example fault-mitigation circuit according to an example embodiment.

FIG. 3 illustrates an example circuit 300 in which fault-mitigation circuits may be used to mitigate faults detected in one or more circuit elements. Such elements may be components of an aerial vehicle, such as the aerial vehicle 230 depicted in FIG. 2. It should be understood that the circuit 300 may depict just a portion of a larger circuit or system that may be used to facilitate operation of an aerial vehicle, an energy kite system, or some other system altogether.

As depicted, the circuit 300 includes a voltage source 304 and four circuit elements 302a-d coupled together in series to form a stack 312. It should be understood that the depiction of four circuit elements arranged in the stack 312 is just an example, and in other examples more or fewer circuit elements may be arranged in the stack 312, or the circuit elements may not be arranged in stacks at all, perhaps even being electrically isolated from one another. The circuit elements 302a-d may include energy storage components (not shown). The energy storage components may include a capacitor, a battery, or any other component capable of storing electrical energy.

In some embodiments, the circuit elements are power sources, meaning that each element 302a-d produces power; in other embodiments, the circuit elements are power sinks, meaning that each element 302a-d consumes power; and in still other embodiments, circuit elements 302a-d are a combination of power sources and power sinks in which at least one element 302a-d produces power and at least one element 302a-d consumes power. Thus, elements 302a-d may be similar to components of the power system 234 depicted in FIG. 2, such as one or more motors or engines. Additionally or alternatively, elements 302a-d may be similar to components of the control system 248 depicted in FIG. 2, such as a wing servo or other control motor.

In accordance with one example arrangement of fault-mitigation circuits in FIG. 3, four fault-mitigation circuits are provided in parallel to the stacked circuit elements 302a-d. More particularly, a first fault-mitigation circuit is coupled in parallel to element 302a and is embodied as a switch 306a coupled to a controller 308. Similarly, a second fault-mitigation circuit is coupled in parallel to element 302b and is also embodied as a switch 306b coupled to the controller 308. Similarly, a third fault-mitigation circuit is coupled in parallel to element 302c and is also embodied as a switch 306c coupled to the controller 308. And similarly, a fourth fault-mitigation circuit is coupled in parallel to element 302d and is also embodied as a switch 306d coupled to the controller 308.

As depicted in FIG. 3, the switches of each fault-mitigation circuit are embodied as MOSFETs; however in other embodiments, the switches may be other types of devices. Moreover, it should be understood that in other embodiments, other arrangements may include more or fewer fault-mitigation circuits, depending on the number of circuit elements for which it is desired to mitigate faults.

In order to utilize the fault-mitigation circuits to mitigate faults in the circuit elements 302a-d in the stack 312, the switches 306a-d may be selectively operated in accordance with one or more example control methods. In operation according to these control methods, electrical energy will be discharged from the energy storage components of one or more circuit elements.

The controller 308 may include one or more processors, such as the processors 242 depicted in FIG. 2, to facilitate operation of the switches 306a-d. As depicted in FIG. 3, where the switches 306a-d are implemented with MOSFETs, the gate portion of each MOSFET is separately coupled to the controller 308; however, in embodiments in which the switches 306a-d are implemented with some other type of device, the appropriate portion of those devices may be coupled to the controller 308 to facilitate operation of the switches.

In accordance with an example control method, the controller 308 may detect a fault in one of the circuit elements 302a-d. A fault may be detected when the controller 308 determines that a voltage across one of the circuit elements 302a-d is above a threshold high value or below a threshold low value. The threshold high value may be a predetermined voltage level that is higher than a typical voltage, where the typical voltage is the voltage across a circuit element 302a-d during normal operation. Similarly, the threshold low value may be a predetermined voltage level that is lower than the typical voltage. A fault may be caused by an open circuit, a short circuit, or any other aspect of a circuit element 302a-d that may cause its voltage to rise above the threshold high value or fall below the threshold low value.

In order to determine the voltage across the circuit elements 302a-d, the controller 308 may be electrically coupled to the circuit elements 302a-d. In some embodiments, where the circuit elements 302a-d are exposed to high voltage, it may be advantageous to electrically isolate the controller 308 from the rest of the circuit 300. As depicted in FIG. 3, the controller 308 is electrically coupled to the circuit elements 302a-d through a number of high voltage dividers 310a-e; however, in other embodiments, different components may be used to isolate the controller 308, such as optical isolators, or any other electrical isolation component. Similarly, the controller 308 may be electrically isolated from the switches 306a-d by optical isolators or any other electrical isolation component.

Once the controller 308 detects a fault in one of the circuit elements 302a-d by determining that its voltage is above a threshold high value or below a threshold low value, the switch of the fault-mitigation circuit coupled in parallel to the faulty circuit element may be toggled from an open position to a closed position. Closing the switch creates a short circuit across the faulty circuit element and allows an energy storage component of the faulty circuit element to discharge through the switch. In the example circuit 300 depicted in FIG. 3, if the controller 308 determines that the voltage $V_1$ across the circuit element 302a is above the threshold high value, the controller 308 may toggle the switch 306a from the open position to the closed position, allowing an energy storage component of the circuit element 302a to discharge through the switch 306a.

In some embodiments, the energy storage components of the circuit elements 302a-d may store enough energy to damage the switches 306a-d or the circuit elements 302a-d if discharged all at once. In these examples, it may be advantageous to gradually discharge a storage element of a faulty circuit element by cycling the switch of the fault-mitigation circuit coupled in parallel to the faulty circuit element between an open position and a closed position at a varying duty cycle. The duty cycle may initially be low (e.g., 50% or lower) when the energy component of the faulty circuit element stores the most energy and, therefore, discharges the fastest. As the energy component of the faulty circuit element discharges through the switch, the duty cycle may be increased at a predetermined rate until it reaches 100%, where the switch remains closed, allowing the energy component to completely discharge.

In the example circuit 300 depicted in FIG. 3, if there is a fault in the circuit element 302a, the controller 308 may cycle the switch 306a between an open position and a closed position at a varying duty cycle until an energy storage component in the circuit element 302a is completely discharged, at which point the switch 306a remains closed. The duty cycle may initially be 50% or lower and may increase to 100% at a predetermined rate, and the entire process may be completed in 10 milliseconds or less.

In another example, a switch of a fault-mitigation circuit coupled in parallel to a faulty circuit element may be cycled between an open position and a closed position at a duty cycle that varies depending on an electrical current through the switch. In operation according to this example, upon detecting a fault, the controller may toggle the switch coupled in parallel to the faulty circuit element from an open position to a closed position, allowing an energy storage component in the faulty circuit element to discharge through the switch. While the energy storage component is discharging, the controller may measure an electrical current through the switch using a current probe, ammeter, or any other device for measuring electrical current. If the measured current exceeds a threshold high value, the controller may toggle the switch from the closed position to the open position. The threshold high value may be a predetermined value that is chosen based on the characteristics of the switch. For example, for a switch with a maximum current rating, the threshold high value may be equal to or lower than the maximum current rating of the switch. The switch may remain in the open position for a predetermined amount of time, at which point the controller toggles the switch from the open position to the closed position. This process may be repeated until the energy storage component of the faulty circuit element is completely discharged, at which point the switch remains in the closed position.

In embodiments in which the switches are implemented with MOSFETs, the controller may toggle a MOSFET on by applying a particular voltage (e.g., 8.0 V) between the gate and source terminals of the MOSFET and toggle a MOSFET off by removing the application of voltage between the gate and source terminals and/or by applying a lesser voltage (e.g., 0.5 V) between the gate and source terminals of the MOSFET. Thus, in order to cycle a switch (e.g., switch 306a) according to a duty cycle, the controller may cycle back and forth between alternate application and de-application of the particular voltage to the switch. The ratio of the amount of time one switch is toggled on to the amount of time the switch is toggled off defines the duty cycle. For instance, a 50% duty cycle dictates that over the course of a switching cycle, the amount of time a switch is toggled on is about equal to the amount of time the switch is toggled off. On the other hand a duty cycle of, say, 75% dictates that over the course of a switching cycle, the amount of time a switch is toggled on is about three times longer than the amount of time the switch is toggled off.

In accordance with the example control method for the fault-mitigation circuit arrangement depicted in FIG. 3, upon detecting a fault in one of the circuit elements 302a-d and discharging an energy storage component of the faulty circuit element, it may be advantageous to concurrently lower the voltage level of the voltage source 304. When the switch coupled in parallel to the faulty circuit element is closed, the faulty circuit element is short circuited and its voltage drops to zero or near zero volts, and the voltages across the remaining unfaulty circuit elements increase accordingly. To compensate for this, the controller may lower the voltage level of the voltage source 304 so the voltages across the unfaulty circuit elements are not increased.

In the example circuit 300 depicted in FIG. 3, when there are no faults in any of the circuit elements 302a-d, the voltages across the circuit elements $V_{1-4}$ may be equal to respective typical operating voltages. Once a fault is detected, for example if the controller 308 determines that the voltage $V_1$ across the circuit element 302a is above the threshold high value, the controller 308 may cycle the switch 306a between an open position and a closed position, allowing an energy storage component of the circuit element 302a to discharge through the switch 306a. As the energy storage component of the circuit element 302a discharges, $V_1$ is lowered and approaches zero volts once the switch 306a remains closed. As a result of $V_1$ lowering, $V_{2-4}$ increase accordingly. To compensate for this, the controller 308 may lower the voltage level of the voltage source 304 until $V_{2-4}$ are equal to their respective typical operating voltages.

The circuit 300 may further include a fault-sensing inductor 314 connected in series to the voltage source 304. When a fault occurs in one of the circuit elements 306a-d, a change in current from the voltage source 304 may induce a voltage across the fault-sensing inductor 314. In response to detecting an induced voltage across the fault-sensing inductor 314, the voltage supplied by the voltage source 304 may be lowered by a predetermined amount.

Figure 4:
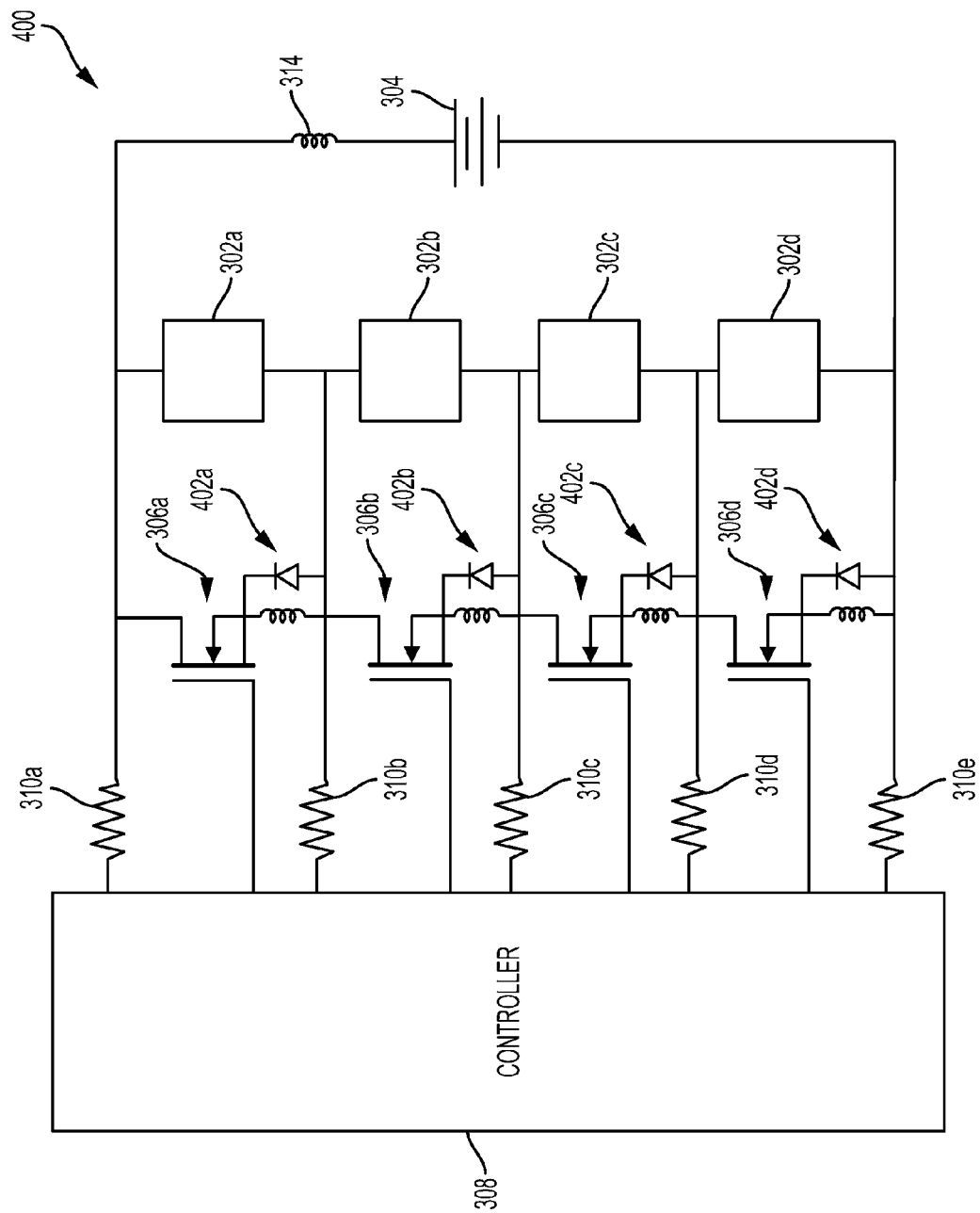
FIG. 4 depicts another example fault-mitigation circuit according to an example embodiment.

FIG. 4 depicts an alternate arrangement for fault-mitigation circuits that may utilize current suppressor elements to help mitigate faults in circuit elements. Circuit 400 is chiefly the same as circuit 300, however circuit 400 includes current suppressor elements 402a-d each coupled in series with switches 306a-d respectively. As depicted, the current suppressor elements 402a-d each include an inductor coupled in parallel with a diode; however, in other arrangements, the current suppressor elements may include other components, such as a resistor, a thermistor, or any other inrush current limiter.

In FIG. 4, the inductors limit the inrush current to the switches 306a-d while the diodes act as flyback diodes to prevent voltage spikes across the inductors. For example, if the controller 308 detects a fault in circuit element 302a, switch 306a is cycled between an open position and a closed position. When switch 306a is toggled closed, the inductor in current suppressor element 402a limits the inrush current to switch 306a. When switch 306a is toggled open, the flyback diode of current suppressor element 402a prevents a voltage spike across the inductor of current suppressor element 402a. The size of the inductors in current suppressor elements 402a-d may be chosen based on the current ratings of the switches 306a-d and the duty cycle of the switches 306a-d during operation of the example control method described above. Switches with lower current ratings require larger inductors to further suppress inrush current. On the other hand, by lowering the duty cycle of switches 306a-d, smaller inductors may be used. This may be advantageous for arrangements where size and weight are important considerations, for example when the circuit 400 is implemented as part of an aerial vehicle, such as the aerial vehicle 100 depicted in FIG. 1.

Figure 5:
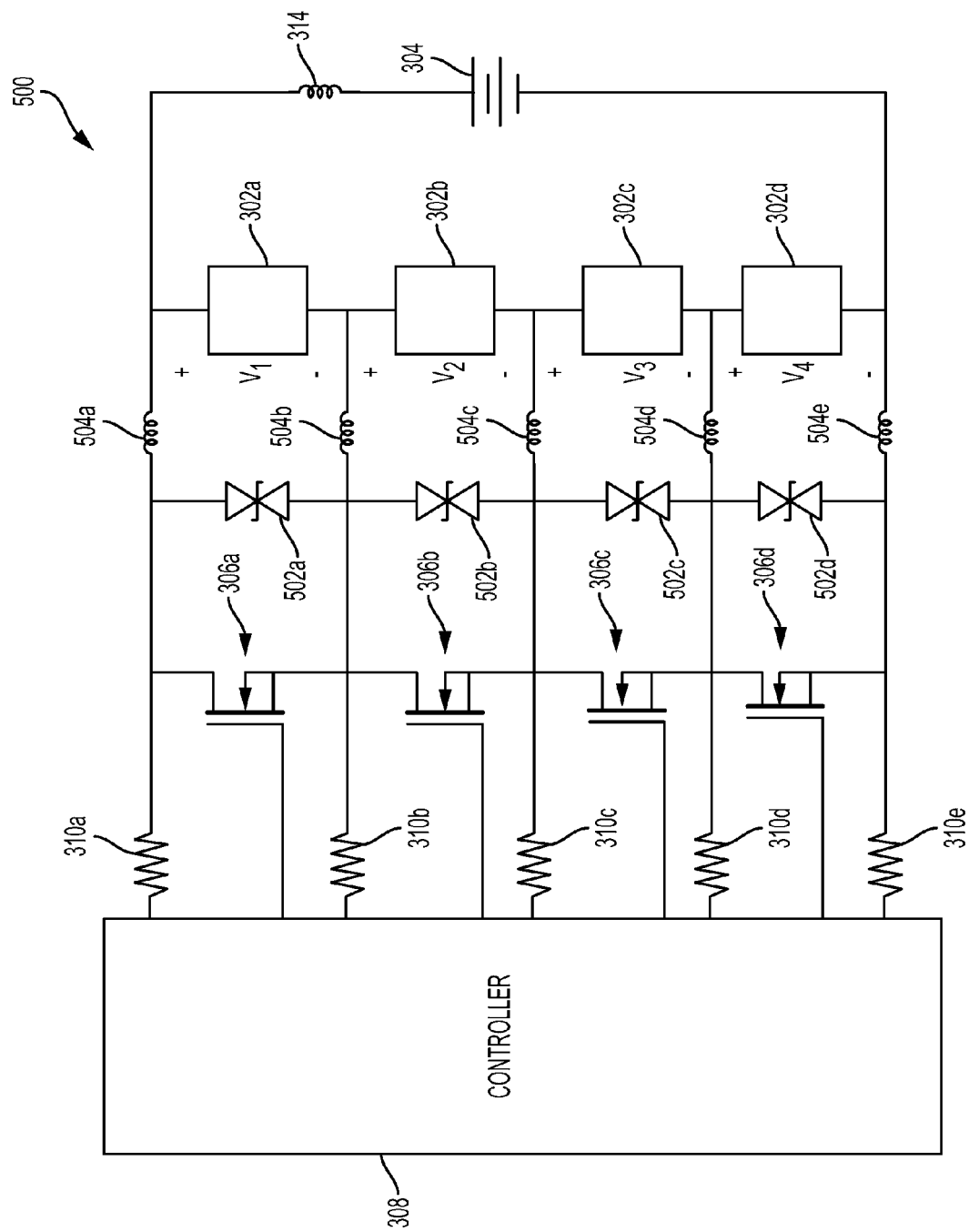
FIG. 5 depicts another example fault-mitigation circuit according to an example embodiment.

FIG. 5 depicts an alternate arrangement for fault-mitigation circuits that may utilize energy absorbing elements to help mitigate faults in circuit elements. Circuit 500 is chiefly the same as circuit 300, however circuit 500 includes energy absorbing elements 502a-d each coupled in parallel to switches 306a-d respectively. The energy absorbing elements 502a-d are further coupled in parallel to the circuit elements 302a-d respectively by inductors 504a-e. As depicted, the energy absorbing elements 502a-d each include one or more varistors, such as metal-oxide varistors; however, in other arrangements, the energy absorbing elements may include other components, such as a gas discharge tube or any other voltage suppressor.

In operation, the energy absorbing elements 502a-d protect the switches 306a-d from overvoltage conditions by absorbing energy from the storage element of a faulty circuit element when the switches 306a-d are in an open position. The inductors 504a-e limit the rate of change of current flowing from the storage element of a faulty circuit element by directing current to the energy absorbing elements 502a-d when cycling the switches 306a-d. For example, if the controller 308 detects a fault in circuit element 302a, switch 306a is cycled between an open position and a closed position. When switch 306a is toggled closed, current flows from the storage element of circuit element 302a through switch 306a, as well as through inductors 504a and 504b. When switch 306a is toggled open, the voltage across the switch 306a and the energy absorbing element 502a increases. As the voltage across the energy absorbing element 502a increases, the energy absorbing element 502a becomes more conductive. Inductors 504a and 504b limit the rate of change of current flowing from the storage element of circuit element 302a by directing current through the energy absorbing element 502a while switch 306a is in the open position.

In some embodiments, the inductors 504a-e may include discrete inductors; however, the inductors 504a-e may alternatively or additionally include a parasitic inductance of the conductors connecting the energy absorbing elements 502a-d to the circuit elements 302a-d.

Figure 6:
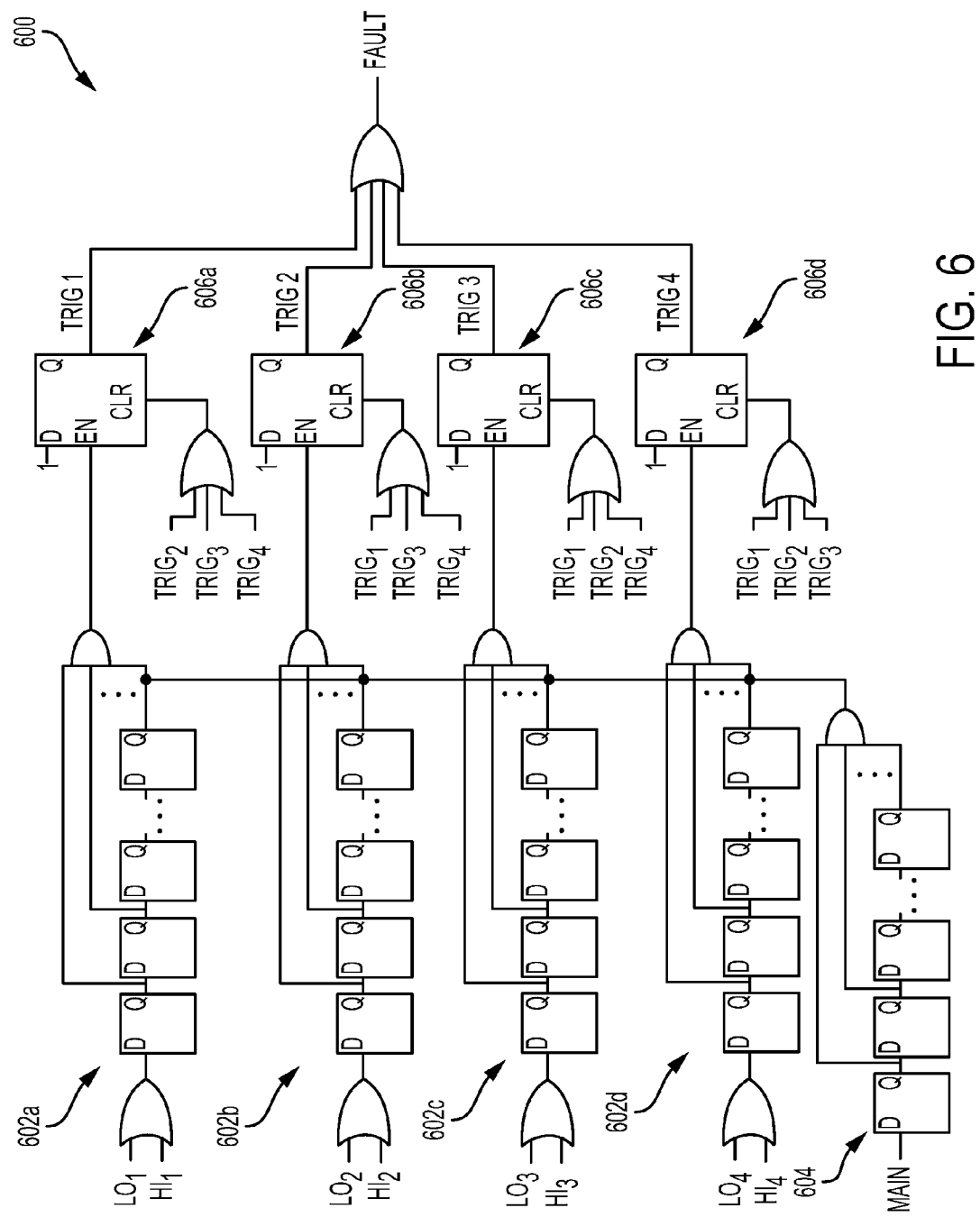
FIG. 6 depicts a fault-detection circuit according to an example embodiment.

FIG. 6 depicts a fault-detection circuit 600 that may be implemented as part of a fault-mitigation circuit according to an example embodiment and may be implemented as part of the controller 308 depicted in FIGS. 3-5. The fault-detection circuit 600 includes an arming circuit 604, four delay circuits 602a-d, and four lockout circuits 606a-d (one delay circuit and one lockout circuit for each of the four circuit elements 302a-d). As with the number of circuit elements 302a-d depicted in FIGS. 3-5, it should be understood that the depiction of four delay circuits 602a-d and four lockout circuits 606a-d is just an example, and in other examples more or fewer delay circuits and lockout circuits may be implemented.

In operation, the fault-detection circuit 600 is arranged to output a logic signal based on whether a fault is detected in one of the circuit elements 302a-d. In FIG. 6, the fault-detection circuit 600 is arranged to output a logic high signal when a fault is detected; however, the fault-detection circuit 600 may alternatively be arranged to output a logic low signal when a fault is detected. The arming circuit 604 is configured to prevent the fault-detection circuit 600 from outputting a logic high until the voltage source 304 has been turned on for a predetermined amount of time. This improves the accuracy of the fault-detection circuit 600 by eliminating false positives that may occur due to low voltage or transient events when the voltage source 304 is first turned on. Similarly, the delay circuits 602a-d are configured to prevent the fault-detection circuit 600 from outputting a logic high until the voltage across one of the circuit elements 302a-d is above a threshold high value or below a threshold low value for a predetermined amount of time. This improves the accuracy of the fault-detection circuit 600 by eliminating false positives that may occur due to transient variations of the voltages across the circuit elements 302a-d. The lockout circuits 606a-d are configured to prevent more than one of the switches 306a-d from being toggled closed at any given time.

The arming circuit 604 includes a number of chained D flip-flops, the output of each being input to an AND gate. The chained D flip-flops may share a clock signal. A MAIN logic signal is input to the first D flip-flop. The MAIN logic signal may be configured to be logic high when the voltage source 304 is turned on and logic low when the voltage source 304 is turned off. When the voltage source 304 is turned on, the MAIN logic signal becomes logic high. The logic high signal is passed through the chained D flip-flops one at a time at the rate of the clock signal. Once the logic high signal has passed through all of the chained D flip-flops, the AND gate outputs a logic high signal, arming the fault-detection circuit 600 and allowing faults to be detected. The length of the arming delay provided by the arming circuit 604 may be increased or decreased by increasing or decreasing the number of chained D flip-flops. Similarly, the length of the arming delay may be increased or decreased by increasing or decreasing the period of the clock signal.

Similar to the arming circuit 604, each of the delay circuits 602a-d include a number of chained D flip-flops, the output of each being input to an AND gate, and the chained D flip-flops may share a clock signal. Each of the delay circuits 602a-d may include two logic input signals, $LO_{1-4}$ and $HI_{1-4}$ configured to be logic high when a particular fault is present. The $LO_{1-4}$ signals may be configured to be logic high when the voltage across a corresponding circuit element 302a-d is below the threshold low value. For example, $LO_1$ may be logic high when the voltage across circuit element 302a is below the threshold low value, and so on. The $HI_{1-4}$ signals may be configured to be logic high when the voltage across a corresponding circuit element 302a-d is above the threshold high value. For example, $HI_1$ may be logic high when the voltage across circuit element 302a is above the threshold value, and so on.

As depicted in FIG. 6, each of the delay circuits 602a-d includes an OR gate configured to output a logic high value into the input of the chained D flip-flops when either of its inputs is logic high. When the voltage across one of the circuit elements 302a-d is above the threshold high value or below the threshold low value, an input to one of the delay circuits 602a-d becomes logic high. The logic high signal is passed through the chained D flip-flops one at a time at the rate of the clock signal. For example, if the voltage across circuit element 302a is above the threshold high value, the $HI_1$ input becomes logic high. The logic high signal passes through the chained D flip-flops of delay circuit 602a. Once the logic high signal has passed through all of the chained D flip-flops, and once the arming circuit 604 outputs a high signal, the AND gate of delay circuit 602a outputs a logic high signal. If, at any time before the logic high signal passes through each of the chained D flip-flops, the voltage across circuit element 302a returns to a value below the threshold high value and above the threshold low value, a logic low signal is input to the chained D flip-flops, and the AND gate of delay circuit 602a outputs a logic low signal. Similar to the arming circuit 604, the length of the delay provided by the delay circuits 602a-d may be increased or decreased by increasing or decreasing the number of chained D flip-flops or by increasing or decreasing the period of the clock signal.

While the arming circuit 604 and delay circuits 602*a-d* in the fault-detection circuit 600 in FIG. 6 include chained D flip-flops to introduce delay, other sources of delay may be used as well, such as various shift registers, counters, or other known configurations of logic devices.

The lockout circuits 606*a-d* include output signals TRIG$_{1-4}$ configured to be logic high when a fault is present in a corresponding circuit element 302*a-d*. As depicted in FIG. 6, each of the lockout circuits 606*a-d* include a D flip-flop with enable and clear inputs. When a logic high signal is input to the enable input, the D flip-flop is configured to output a logic high signal. When a logic high signal is input to the clear input, the D flip-flop is configured to output a logic low signal. By connecting the clear input of one lockout circuit 606*a-d* to the outputs of the other lockout circuits 606*a-d* through an OR gate, only one of the lockout circuits 606*a-d* may output a logic high value at any given time.

For example, if the voltage across circuit element 302*a* is above the threshold value long enough for delay circuit 602*a* to output a logic high value, the D flip-flop of lockout circuit 606*a* is enabled, and the TRIG$_1$ signal becomes logic high. The logic high TRIG$_1$ signal is passed through OR gates to the clear inputs of the D flip-flops in the lockout circuits 606*b-d*, so when the TRIG$_1$ signal is logic high, the TRIG$_{2-3}$ signals are all logic low. Because the lockout circuits 606*a-d* are configured in a "first-in" arrangement ensuring only one lockout circuit may be activated at any given time, the lockout circuits 606*a-d* may be synchronous and clocked by a four-phase clock in order to avoid race conditions.

The controller 308 may be configured to activate a corresponding switch 306*a-d* when one of the outputs TRIG$_{1-4}$ of lockout circuits 606*a-d* becomes logic high. For example, when TRIG1 is logic high, the controller 308 may cycle switch 306*a* to mitigate a fault in circuit element 302*a*, and so on. Because only one of the outputs TRIG$_{1-4}$ of the lockout circuits 606*a-d* may be logic high at any given time, the controller 308 may only cycle one of the switches 306*a-d* at any given time.

Figure 7:
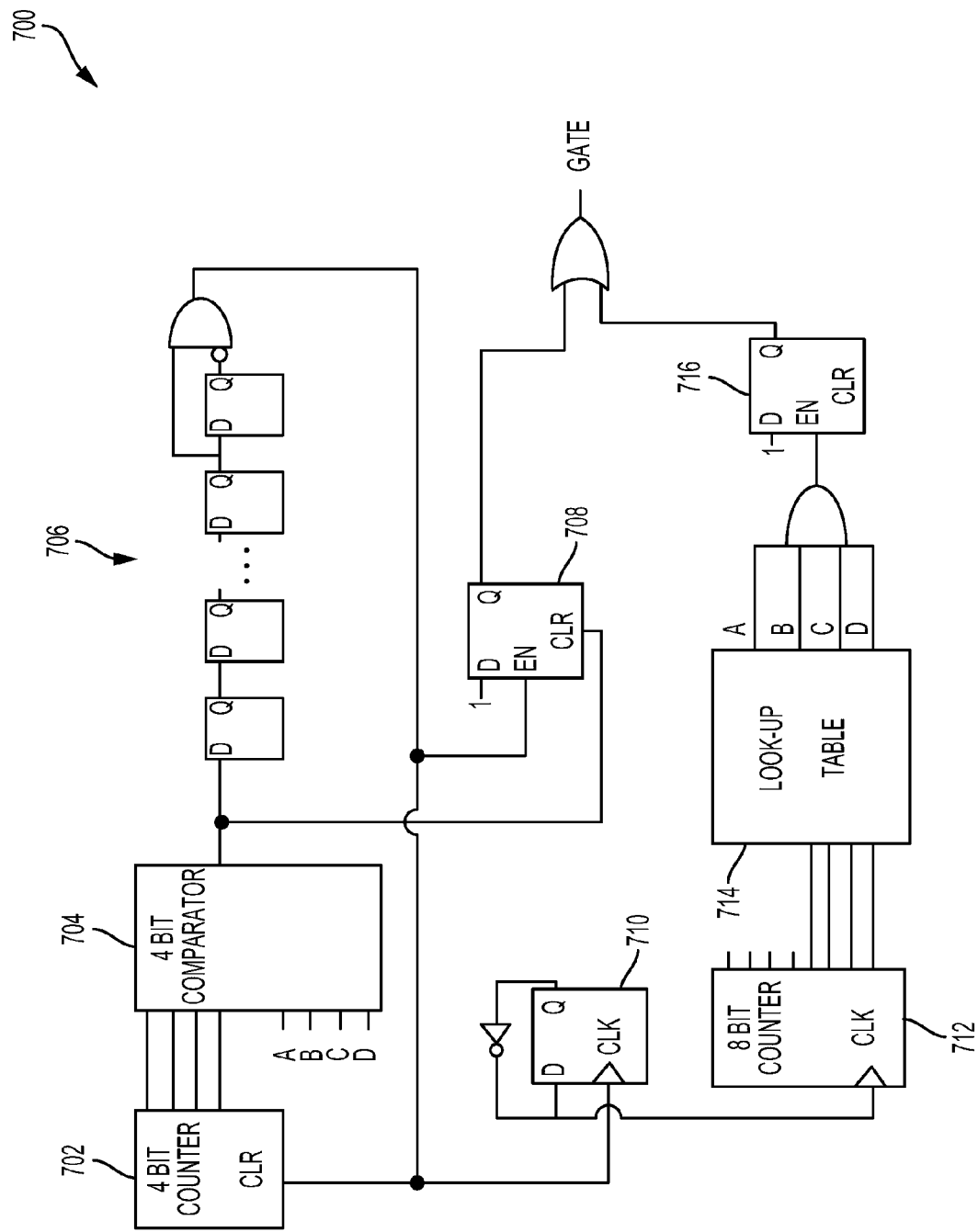
FIG. 7 depicts a pulse-width modulation circuit according to an example embodiment.

FIG. 7 depicts a pulse-width modulation circuit 700 that may be implemented as part of a fault-mitigation circuit according to an example embodiment and may be implemented as part of the controller 308 depicted in FIGS. 3-5. The pulse-width modulation circuit 700 may be configured to generate a signal with a varying duty cycle that increases at a predetermined rate. The output of the pulse-width modulation circuit 700 may be used to cycle one of the switches 306*a-d* according to the varying duty cycle.

As depicted in FIG. 7, the pulse-width modulation circuit 700 includes a first counter 702, a comparator 704, a delay circuit 706, a first latch 708, a second latch 710, a second counter 712, a lookup table 714, a third latch 716, and an OR gate 718. The first counter 702 is depicted as a 4-bit counter and the second counter 712 is depicted as an 8-bit counter, but these counters may be implemented as any type of digital counters in other examples. The comparator 704 is depicted as a 4-bit comparator, but may be implemented as any type of comparator in other examples. The delay circuit 706 is depicted as chained D flip-flops, but other sources of delay may be used as well, such as various shift registers, counters, or other known configurations of logic devices. Similarly, the first latch 708, second latch 710, and third latch 716 are depicted as D flip-flops, but various other types of latches may be implemented in other example embodiments. All logic devices depicted in FIG. 7 may share a clock signal unless indicated otherwise.

In operation, the first counter 702 generates a 4-bit signal that is input to the comparator 704. The comparator 704 compares the 4-bit signal from the first counter 702 with a 4-bit signal ABCD from the lookup table 714. When the 4-bit signal from the first counter 702 equals the 4-bit signal ABCD from the lookup table 714, the comparator 704 outputs a logic high signal; otherwise, the comparator 704 outputs a logic low signal.

The output of the comparator 704 is connected to a clear input of the first latch 708, so when the output of the comparator 704 is logic high, the first latch 708 outputs a logic low signal to the OR gate 718. The logic high output from the comparator 704 is concurrently passed through the chained D flip-flops of the delay circuit 706. An AND gate connected to the end of the delay circuit 706 is configured to output a logic high signal for one clock cycle after the logic high signal from the comparator 704 passes through the chained D flip-flops.

The output of the delay circuit 706 is connected to an enable input of the first latch 708, so when the output of the delay circuit 706 is logic high, the first latch 708 outputs a logic high signal until the clear input of the first latch 708 receives the next logic high signal from the output of the comparator 704. By varying the number of chained D flip-flops in the delay circuit 706, the time difference between the enable input of the first latch 708 receiving a logic high signal and the clear input of the first latch 708 receiving a logic high signal may be varied.

The output of the delay circuit 706 is also connected to a clear input of the first counter 702, such that when the delay circuit 706 outputs a logic high signal for one clock cycle, the output of the first counter 702 is reset to zero. After being reset to zero, the first counter 702 resumes counting by incrementing its outputs to the comparator 704 with each clock cycle.

The output of the delay circuit 706 is further connected to a clock input of the second latch 710. The second latch 710 is configured to output a logic signal that alternates between low and high each time the delay circuit 706 outputs a logic high signal. Thus, the second latch 710 generates an output with a frequency equal to half the frequency of the delay circuit 706 output. This lower frequency signal from the second latch 710 is used as the clock signal to drive the second counter 712. The clock signal for the second counter 712 may be effectively reduced even further by only using the four most significant digits (and ignoring the four least significant digits) of the output generated by the second counter 712 as depicted in FIG. 7.

The output of the second counter is used to determine the 4-bit output ABCD of the lookup table 714. The lookup table 714 may be any device configured to output a predetermined 4-bit signal ABCD based on a 4-bit input signal. For example, the lookup table 714 may include four 16:1 multiplexers, where the 4-bit signal from the second counter 712 is used to determine the output of each of the multiplexers. Other arrangements are possible as well.

The lookup table 714 may be configured so that as the 4-bit signal from the second counter 712 increases, the 4-bit output ABCD from the lookup table 714 increases as well. As the 4-bit output ABCD increases, the amount of time between logic high outputs of the comparator 704 increases. This causes the first latch 708 to be cleared less frequently, which results in an increased duty cycle in the output of the OR gate 718.

As the 4-bit output ABCD increases, so does the duty cycle of the OR gate 718 output. Ultimately, the lookup table 714 is configured to increase the 4-bit output ABCD to its maximum value (1111). When all outputs of the lookup table 714 are logic high, the third latch 716 is enabled, and a logic high signal is input to the OR gate 718. Once the third latch 716 is enabled, it will continue to output a logic high signal to the OR gate 718, causing the output of the OR gate 718 to have a duty cycle of 100%.

Figure 8:
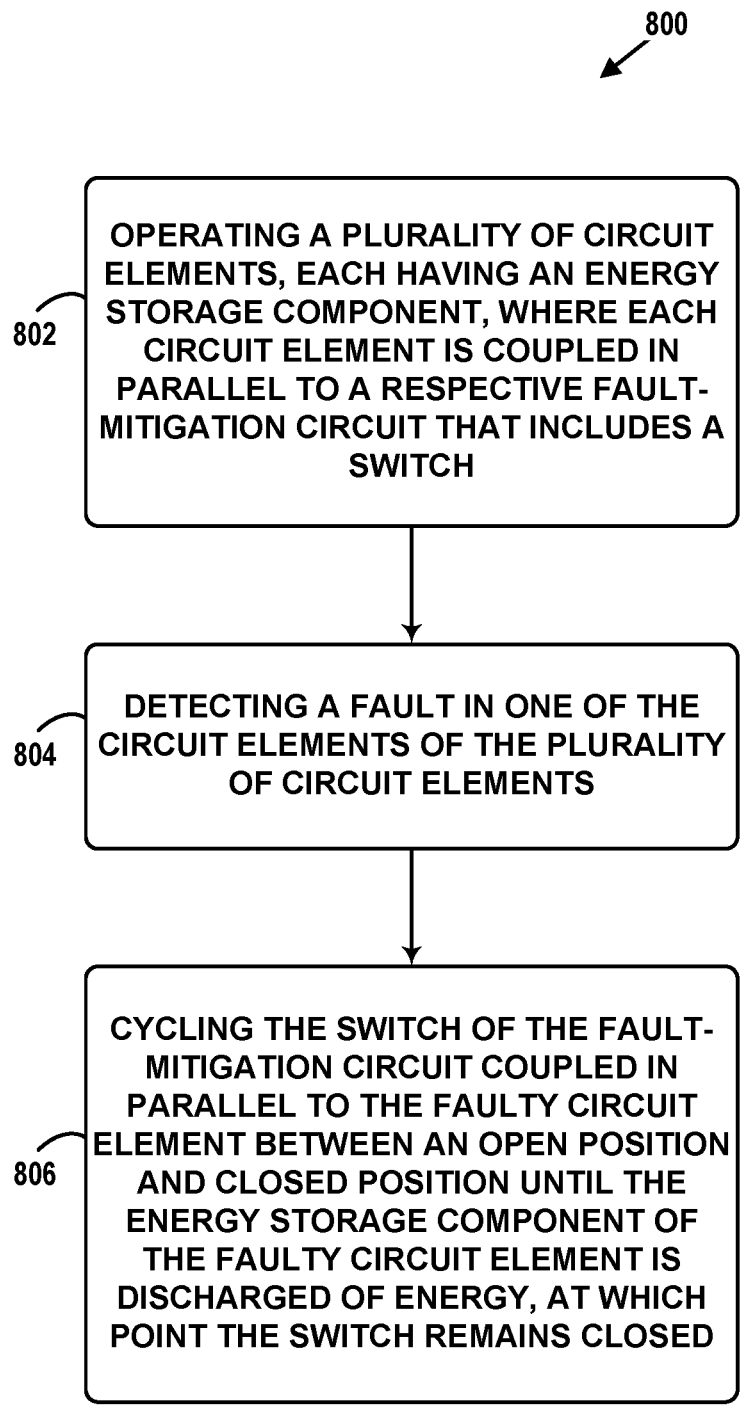
FIG. 8 depicts a flowchart of a method according to an example embodiment.

FIG. 8 is a flowchart of an example method 800 that could be used to mitigate faults in circuit elements of various arrangements, including in a stacked topology. The example method 800 may include one or more operations, functions, or actions, as depicted by one or more of blocks 802, 804, and/or 806, each of which may be carried out by any of the systems described by way of FIGS. 1-7; however, other configurations could be used.

Furthermore, those skilled in the art will understand that the flowchart described herein illustrates functionality and operation of certain implementations of example embodiments. In this regard, each block of the flow diagram may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Method 800 begins at block 802, which includes operating a plurality of circuit elements, where each circuit element includes an energy storage component, and each circuit element is coupled in parallel to a respective fault-mitigation circuit that includes a switch. As described above, in some embodiments the circuit elements may be some combination of power sources and/or power sinks. These circuit elements may be portions of an energy kite (as well as portions of other types of systems), such as motors and/or generators.

Method 800 continues at block 804, which includes detecting a fault in one of the circuit elements of the plurality of circuit elements. As described above, in one example embodiment, a fault may be detected by determining that the voltage across one of the circuit elements is above a threshold high voltage or below a threshold low voltage. To carry out this detection, a controller may periodically measure the voltage across each circuit element and compare the measured voltage to predetermined threshold high and threshold low voltages.

Method 800 continues at block 806, which includes cycling the switch of the fault-mitigation circuit coupled in parallel to the faulty circuit element between an open position and a closed position until the energy storage component of the faulty circuit element is discharged of energy, at which point the switch remains closed. As described above, the switch may be cycled between open and closed positions in accordance with a varying duty cycle. The duty cycle may initially be low (e.g., 50% or lower) and may increase at a predetermined rate to 100%, at which point the switch remains in the closed position.

In addition to the operations depicted in FIG. 8, other operations may be utilized with the example fault-mitigation circuit arrangements presented herein.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method comprising:
   operating a plurality of circuit elements, wherein each circuit element comprises an energy storage element; and
   operating a plurality of fault-mitigation circuits, each individual fault-mitigation circuit being electrically coupled in parallel to a respective circuit element and each individual fault-mitigation circuit comprising a switch that in a closed position will cause the energy storage element to drain and in an open position will not cause the energy storage element to drain, wherein operating the plurality of fault-mitigation circuits comprises:
   detecting an electrical fault in one of the circuit elements of the plurality of circuit elements; and
   cycling the switch of the fault-mitigation circuit coupled in parallel to the faulty circuit element between the open position and the closed position until the storage element of the faulty circuit element is discharged of energy, at which point the switch remains closed.

2. The method of claim 1, wherein detecting an electrical fault in one of the plurality of circuit elements comprises determining that the voltage across the one of the plurality of circuit elements is above a threshold high value or below a threshold low value.

3. The method of claim 1, wherein the switch has a duty cycle and cycling the switch of the fault-mitigation circuit coupled in parallel to the faulty circuit element between the open position and the closed position comprises incrementally increasing the switch's duty cycle until it reaches 100 percent.

4. The method of claim 1, wherein cycling the switch of the fault-mitigation circuit coupled in parallel to the faulty circuit element between the open position and the closed position comprises repeating the following sequence of steps:
   closing the switch;
   determining an electrical current in the switch; and
   opening the switch in response to detecting the electrical current in the switch has reached a threshold switch current value.

5. The method of claim 1, wherein each individual fault-mitigation circuit further comprises an energy absorbing element electrically coupled in parallel to the switch.

6. The method of claim 1, wherein each circuit element of the plurality of circuit elements is electrically coupled in series to form a stack.

7. The method of claim 6, wherein operating the plurality of circuit elements comprises supplying a voltage across the stack, wherein operating the plurality of fault-mitigation circuits further comprises, in response to detecting an electrical fault in one of the circuit elements of the plurality of circuit elements, lowering the voltage across the stack.

8. The method of claim 7, wherein the voltage across each circuit element when none of the circuit elements have an electrical fault is a typical operating voltage, wherein lowering the voltage across the stack comprises lowering the voltage across the stack until the voltage across each unfaulty circuit element is the typical operating voltage.

9. The method of claim 1, wherein each circuit element further comprises a motor of an aerial vehicle.

10. The method of claim 1, wherein each circuit element further comprises a generator of an aerial vehicle.

11. A system comprising:
a plurality of circuit elements, wherein each circuit element comprises an energy storage element;
a plurality of fault-mitigation circuits, each individual fault-mitigation circuit being electrically coupled in parallel to a respective circuit element and each individual fault-mitigation circuit comprising a switch that in a closed position will cause the energy storage element to drain and in an open position will not cause the energy storage element to drain; and
a controller coupled to each fault-mitigation circuit of the plurality of fault-mitigation circuits, the controller being configured to carry out operations comprising:
detecting an electrical fault in one of the circuit elements of the plurality of circuit elements; and
cycling the switch of the fault-mitigation circuit coupled in parallel to the faulty circuit element between the open position and the closed position until the storage element of the faulty circuit element is discharged of energy, at which point the switch remains closed.

12. The system of claim 11, wherein detecting an electrical fault in one of the plurality of circuit elements comprises determining that the voltage across the one of the plurality of circuit elements is above a threshold high value or below a threshold low value.

13. The system of claim 11, wherein the switch has a duty cycle and cycling the switch of the fault-mitigation circuit coupled in parallel to the faulty circuit element between the open position and the closed position comprises incrementally increasing the switch's duty cycle until it reaches 100 percent.

14. The system of claim 11, wherein cycling the switch of the fault-mitigation circuit coupled in parallel to the faulty circuit element between the open position and the closed position comprises repeating the following sequence of steps:
closing the switch;
determining an electrical current in the switch; and
opening the switch in response to detecting the electrical current in the switch has reached a threshold switch current value.

15. The system of claim 11, wherein each individual fault-mitigation circuit further comprises an energy absorbing element electrically coupled in parallel to the switch.

16. The system of claim 11, wherein each circuit element of the plurality of circuit elements is electrically coupled in series to form a stack.

17. The system of claim 16, wherein the operations further comprise supplying a voltage across the stack and, in response to detecting an electrical fault in one of the circuit elements of the plurality of circuit elements, lowering the voltage across the stack.

18. The system of claim 17, wherein the voltage across each circuit element when none of the circuit elements have an electrical fault is a typical operating voltage, wherein lowering the voltage across the stack comprises lowering the voltage across the stack until the voltage across each unfaulty circuit element is the typical operating voltage.

19. The system of claim 11, wherein each circuit element further comprises a motor of an aerial vehicle.

20. The system of claim 11, wherein each circuit element further comprises a generator of an aerial vehicle.

* * * * *